(12) United States Patent
Dahlman et al.

(10) Patent No.: US 6,442,153 B1
(45) Date of Patent: Aug. 27, 2002

(54) RANDOM ACCESS IN A MOBILE TELECOMMUNICATIONS SYSTEM

(75) Inventors: Erik Dahlman, Bromma; Karim Jamal, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/169,731

(22) Filed: Oct. 9, 1998

Related U.S. Application Data
(60) Provisional application No. 60/063,024, filed on Oct. 23, 1997.

(30) Foreign Application Priority Data

Oct. 23, 1997 (SE) ............................................. 9703872

(51) Int. Cl.⁷ ............................................. H04B 7/216
(52) U.S. Cl. ..................... 370/342; 370/335; 370/441; 375/140
(58) Field of Search ................ 370/343, 335, 370/342, 320, 441, 491, 500, 515, 314, 319, 321, 326, 328, 329, 330, 336, 337, 341, 344, 345, 347, 349, 350; 375/130, 134, 135, 137, 140, 146, 206

(56) References Cited

U.S. PATENT DOCUMENTS

| | | | | |
|---|---|---|---|---|
| 5,825,807 A | * | 10/1998 | Kumar | 375/130 |
| 5,835,480 A | * | 11/1998 | Chennakeshu | 370/206 |
| 5,943,331 A | * | 8/1999 | Lavean | 370/342 |
| 6,163,533 A | * | 12/2000 | Esmailzadeh et al. | 375/130 |
| 6,172,994 B1 | * | 1/2001 | Schaffner et al. | 370/529 |
| 6,259,724 B1 | * | 7/2001 | Esmailzadeh | 375/143 |

FOREIGN PATENT DOCUMENTS

| | | |
|---|---|---|
| EP | 0 765 096 A2 | 3/1997 |
| WO | WO 97/05708 | 2/1997 |
| WO | WO 98/23047 | 5/1998 |

OTHER PUBLICATIONS

ISR for PCT/SE98/01921 completed Jun. 21, 1999, Jul. 1, 1999.

* cited by examiner

*Primary Examiner*—Douglas Olms
*Assistant Examiner*—Phirin Sam
(74) *Attorney, Agent, or Firm*—Jenkens & Gilchrist P.C.

(57) ABSTRACT

A novel format is provided for an uplink common physical channel in a random access mobile communications system, whereby a mobile station transmits a first packet including a predetermined signature pattern in parallel with a second packet including the data part of the random access request. Consequently, in addition to its attendant advantages, the signature part of a random access request can also function as a Pilot by providing additional energy for channel estimation during the data part of the request, while reducing the amount of overhead signalling involved. This additional energy is especially useful for ensuring sufficiently high quality coherent detection of the data part in a rapidly varying radio channel environment.

12 Claims, 3 Drawing Sheets

RANDOM ACCESS IN A MOBILE TELECOMMUNICATIONS SYSTEM

CROSS-REFERENCES TO RELATED APPLICATIONS

This Application for Patent claims the benefit of priority from, and hereby incorporates by reference the entire disclosure of, co-pending U.S. Provisional Application for patent Ser. No. 60/063,024, filed Oct. 23, 1997.

This Application is also related by subject matter to commonly-assigned U.S. Applications for patent Ser. Nos. 08/733,501 and 08/847,655, filed Oct. 18, 1996 and Apr. 30, 1997, respectively.

BACKGROUND OF THE INVENTION

1. Technical Field of the Invention

The present invention relates generally to the mobile telecommunications field and, in particular, to a method for processing multiple random access mobile-originated calls.

2. Description of Related Art

The next generation of mobile communications systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the new generation of mobile communications systems will have to use much faster and flexible random access procedures, in order to increase their access success rates and reduce their access request processing times.

In most mobile communications systems, such as, for example, the European joint development referred to as the "Code Division Testbed" (CODIT), and systems operating in accordance with the IS-95 Standard (ANSI J-STD-008), a mobile station can gain access to a base station by first determining that the RACH is available for use. Then, the mobile station transmits a series of access request preambles (e.g., single 1023 chip symbols) with increasing power levels, until the base station detects the access request. In response, the base station starts the process of controlling the mobile station's transmitted power via a downlink channel. Once the initial "handshaking" between the mobile station and base station has been completed, the mobile user transmits a random access message.

In a Spread Spectrum Slot Reservation Multiple Access (SS-SRMA) System, a slotted ALOHA (S-ALOHA) random access scheme is used. At the beginning of a slot, a mobile station will send a random access packet to the base station and then await an acknowledgment from the base station that the packet was received. This S-ALOHA scheme dispenses with a number of steps that characterize the CODIT and IS-95 random access schemes (namely, power ramping and power control).

More specifically, in a CODIT-based Code Division Multiple Access (CDMA) system, a mobile station will attempt to access the base station receiver by using a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver "despreads" the received (spread spectrum) signals using a matched filter, and diversity-combines the despread signals to take advantage of antenna diversity.

In an IS-95 CDMA system, a similar random access technique is used. However, the primary difference between the CODIT and IS-95 process is that the IS-95 mobile station transmits a complete random access packet instead of just the preamble. If the base station does not acknowledge the access request, the IS-95 mobile station re-transmits the access request packet at a higher power level. This process continues until the base station acknowledges the access request.

In a mobile communications system using an S-ALOHA random access scheme, such as the method disclosed in the above-cited U.S. patent application Ser. No. 08/733,501 (hereinafter, "the '501 Application"), a mobile station generates and transmits a random access packet. A diagram that illustrates a frame structure for such a random access packet is shown in FIG. 1. The random access packet ("access request data frame") comprises a preamble and a data field portion. The preamble contains a unique signature (bit) pattern, which is "L" symbols long. The signature pattern is randomly selected from a set of patterns that are, but not necessarily, orthogonal to each other. As such, the use of this unique signature pattern feature, as described and claimed in the '501 Application, provides a significantly higher throughput efficiency than prior random access schemes.

As described in the '501 Application, the data field of the random access packet includes certain random access information, including mobile (user) identity information, required service number (number of services to be provided), required air time (time needed to complete a message), short packet data message (to increase transmission efficiency), and an error detection redundancy field (cyclic redundancy code). For reasons elaborated in the '501 Application, the spreading ratio (spread spectrum modulation) of the preamble is selected to be longer than the spreading ratio of the data field portion. However, situations may be envisioned in which this is not necessarily so.

The random access packet (e.g., such as the packet shown in FIG. 1) is transmitted by the mobile station at the beginning of the next available slot. A block diagram of an apparatus that can be used in a mobile station to generate and transmit the random access packet illustrated in FIG. 1 is shown in FIG. 2. Essentially, as illustrated by FIG. 2, the preamble and data field of the random access packet are generated and spread separately (with respective spreading codes) and then multiplexed and transmitted by the mobile station.

Next, the random access packet transmitted by the mobile station is received and demodulated at the target base station with a matched filter-based receiver. FIG. 3 is a block diagram of a detection section (for one antenna) of a base station's random access receiver, which functions primarily to estimate the timing of the received signal rays. The matched filter, which is used only during the preamble period, is tuned to the preamble's spreading code. The matched filter is used to detect the presence of the random access request, and despread the preamble part of the random access packet and feed it to the accumulator unit. The accumulator (signatures 1-l) is a unique feature used for the '501 Application's random access method to sum the signals at the output of the matched filter during the preamble's (M) symbol periods, in order to increase the received signal-to-interference (S/I) power ratio. Since each received preamble comprises a unique signature pattern, the accumulation operation is carried out with a plurality of accumulators (1-l), with each accumulator tuned to one of the possible signature patterns to be received.

FIG. 4 is a simple block diagram of an accumulator that can be used for the I channel (quadrature detection) in the random access detector section shown in FIG. 3. A similar accumulator can be used for the Q channel. Referring to FIGS. 3 and 4, the output of each accumulator (signature 1-l) is coupled to a peak detection unit. At the end of the preamble period, each peak detection unit searches the output of its respective matched filter for each signal peak that exceeds a predetermined detection threshold. Each peak detection unit then registers (detects and stores) the magnitude and relative phase of each of those peak signals, and thereby determines the number of significant signal rays available for demodulation in the receiver. As such, the timing of each peak is estimated and used to set the receiver's "Rake" parameters (Rake receiver sections 1-l). FIG. 5 is a block diagram of a random access demodulator that can be used to demodulate the data field portion of the random access packet. Essentially, the random access demodulator section decodes the data information in the received data field and checks for transmission errors.

Notably, although the random access apparatus and method described above with respect to FIGS. 1–5 have numerous advantages over prior random access schemes, a number of problems still exist that remain to be solved. For example, a large number of packet collisions may occur if mobile stations in all of the cells use the same spreading codes during the preamble or data field processing stage. As a consequence, an excessive number of the random access requests will have to be re-transmitted, which can lead to system instability. Moreover, using the random access apparatus and method described above, since the random access requests are transmitted at the beginning of the next time slot, the base station's matched filter receiver is not utilized as efficiently as it can be, because the matched filter receiver is idle for the complete period subsequent to the preamble reception stage. Additionally, since the length of the random access packet used with the above-described scheme is fixed, the size of the short data packets is restricted by the extent of use of the remainder of the packet. For all of these reasons, a more flexible random access request procedure was needed to resolve these problems.

The above-cited U.S. patent application Ser. No. 08/847, 655 (hereinafter, the "'655 Application") successfully resolved these problems. In accordance with the invention described and claimed in the '655 Application, the method assigns each sector in a cell a unique preamble spreading code, and also a unique long-code which is concatenated with the data field's (signature-associated) short spreading code. The period selected for the long-code can be relatively long in duration (e.g., up to hours or days in length). Consequently, it can be said that the data field of the random access packet is transmitted in a dedicated channel, because no two messages can have the same spreading sequence and phase (unless they have chosen the same signature and transmitted their preambles at the same time).

Also in accordance with the invention in the '655 Application, the method sets the widths of the transmission time slots equal to the length of the preamble (minus, for practical purposes, a predefined guard time). Consequently, the mobile station's random access request can be timed to start at the beginning of the slot, and detected during the preamble period by the matched filter in the base station's random access receiver. The data field of the mobile station's random access request is transmitted in the slots succeeding that of the preamble and received by the rake receiver at the base station. However, with that method, subsequent to the preamble period, the matched filter is enabled to receive the preambles of other random access requests made by other mobile stations. Therefore, the matched filter can be utilized continuously and efficiently, and a significantly larger number of random access requests can be processed in comparison with prior random access schemes. As such, the communications throughput and efficiency of a random access system using that method are significantly higher than the throughput and efficiency of prior random access systems.

Nevertheless, other random access problems still exist that need to be solved. For example, FIG. 6 is a diagram that shows the channel structure for a random access packet (uplink common physical channel message format), which is formatted in accordance with the random access frame structures described earlier. In comparison with the prior approaches, the channel format shown in FIG. 6 advantageously reduces the number of random access request collisions that can occur, and also simplifies detection of the data field portion of the random access packet. However, a drawback of using this format is that it is not directed to minimizing the amount of overhead signalling involved.

Referring to FIG. 6, in order to be able to coherently detect the data field portion of the random access packet, a certain amount of energy is transmitted in the form of known modulated symbols (denoted as the "Pilot"). The Pilot can be time-multiplexed, I/Q-multiplexed, or code-multiplexed with the data (actually, the type of modulation used is not pertinent to this discussion). The total "overhead" energy of the random access packet is the shaded portion shown in FIG. 6 (i.e., Preamble plus Pilot). In principle, the Preamble may be used for the same purpose as the Pilot, assuming that a receiver makes a correct decision about the signature transmitted in the Preamble. Consequently, it should be possible to achieve a relatively good radio channel estimate during the Preamble portion of the random access request.

However, in a rapidly varying radio channel, the energy used for the channel estimation ideally should be spread out in time over the data field, in order to achieve a radio channel estimate of sufficient quality during that portion of the random access request. Even if a channel estimate of sufficient quality can be achieved during the Preamble (due to the distinctive signature in the Preamble), in a rapidly varying channel, this estimate might not be valid for a significant part of the Data portion of the random access request. As such, it is important to provide enough energy in the Preamble for the receiver to detect the Preamble and correctly identify the channel paths.

On the other hand, in a rapidly varying radio channel, it is also important to provide enough energy in the Pilot to ensure proper coherent detection of the Data portion. Unfortunately, these two important but conflicting energy requirements in an uplink common physical channel format result in the transmission of random access requests with excessive overhead signalling. In other words, the ratio of "overhead" energy (Preamble+Pilot energy) to the "Data" energy is unnecessarily high, with its attendant disadvantages. Nevertheless, as described in detail below, the present invention successfully resolves these problems.

SUMMARY OF THE INVENTION

In accordance with a preferred embodiment of the present invention, a novel format is provided for an uplink common physical channel in a random access mobile communications system, whereby a mobile station transmits a first packet including a predetermined signature pattern in parallel with a second packet including the data portion of the random access request.

An important technical advantage of the present invention is that the signature portion of the random access request can also function as a pilot, by providing additional energy for channel estimation during the data portion of the request.

Another important technical advantage of the present invention is that additional energy is provided with the random access request for ensuring sufficiently high quality coherent detection of the data portion of the request in a rapidly varying radio channel environment.

Yet another important technical advantage of the present invention is that by transmitting the signature portion of a random access request in parallel with the data portion of the request, the amount of overhead signalling is reduced in comparison with prior approaches.

Still another important technical advantage of the present invention is that the overhead energy need not be increased for rapidly varying channels.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–9 of the drawings, like numerals being used for like and corresponding parts of the various drawings.

Essentially, in accordance with a preferred embodiment of the present invention, a novel format is provided for an uplink common physical channel in a random access mobile communications system, whereby a mobile station transmits a first packet including a predetermined signature pattern in parallel with a second packet including the data portion of the random access request. Consequently, in addition to its other advantages, the signature portion of a random access request can also function as a Pilot by providing additional energy for channel estimation during the data portion of the request, while reducing the amount of overhead signalling involved. This additional energy is especially useful for ensuring sufficiently high quality coherent detection of the data portion in a rapidly varying radio channel environment.

Figure 1:
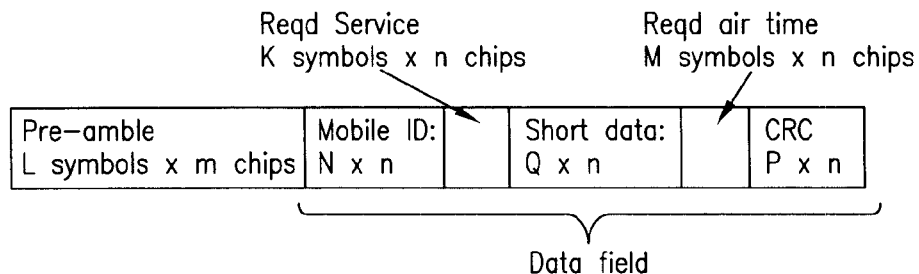
FIG. 1 is a diagram that illustrates a frame structure for a random access packet.
Figure 2:
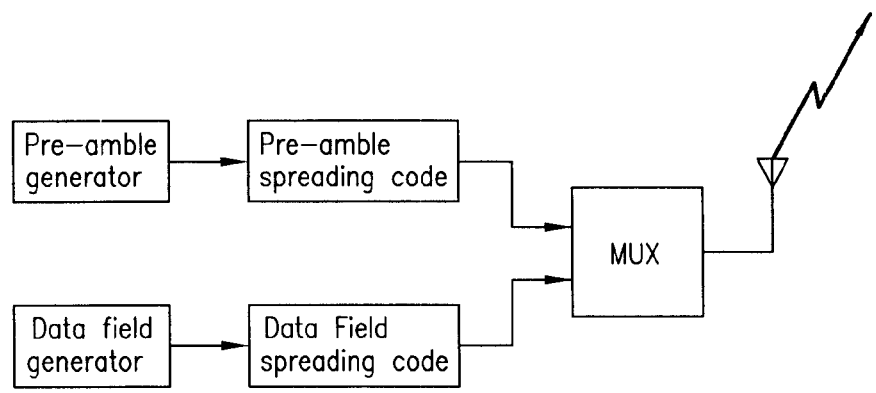
FIG. 2 is a block diagram of an apparatus that can be used in a mobile station to generate and transmit the random access packet illustrated in FIG. 1.
Figure 3:
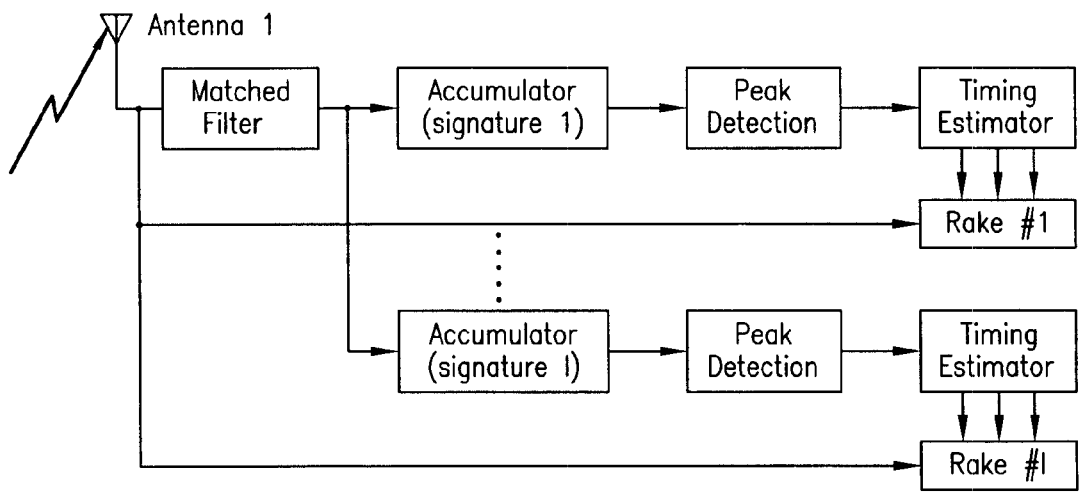
FIG. 3 is a block diagram of a detection section (for one antenna) of a base station's random access receiver, which functions primarily to estimate the timing of the received signal rays.
Figure 4:
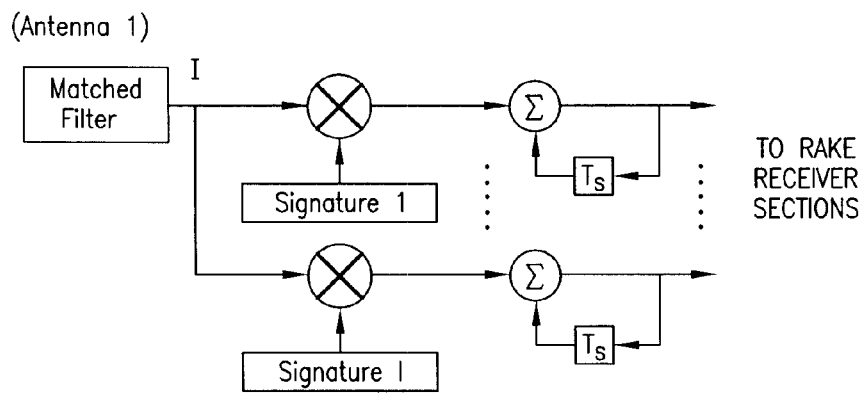
FIG. 4 is a simple block diagram of an accumulator that can be used for the I channel (quadrature detection) in the random access detector section shown in FIG. 3.
Figure 5:
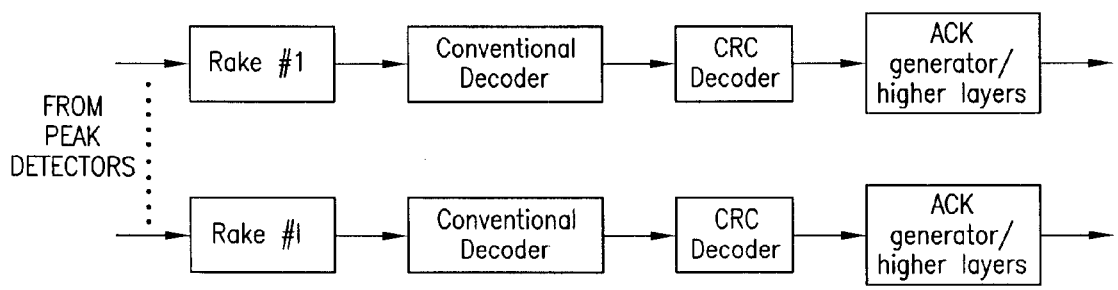
FIG. 5 is a block diagram of a random access demodulator that can be used to demodulate the data field portion of a random access packet.
Figure 6:
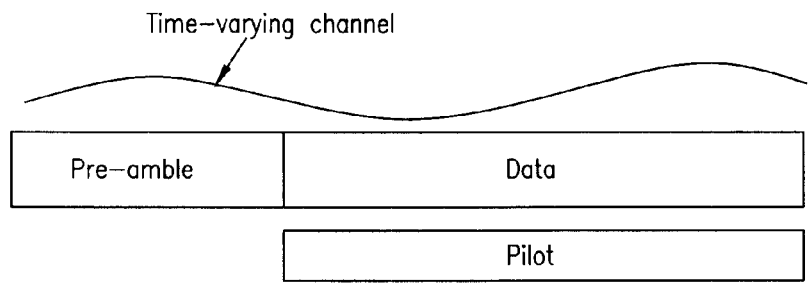
FIG. 6 is a diagram that shows the channel structure for a random access packet (uplink common physical channel message format), which is formatted in accordance with the prior random access frame structures.
Figure 7:
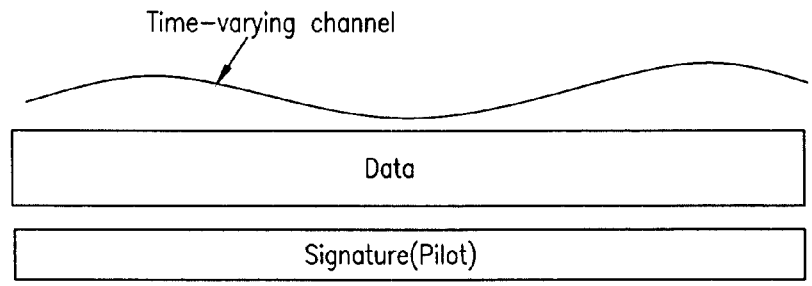
FIG. 7 is a diagram that shows an exemplary format for an uplink common physical channel in a random access communications system, which is structured in accordance with the preferred embodiment of the present invention.

Specifically, FIG. 7 is a diagram that shows an exemplary format for an uplink common physical channel in a random access communications system, which is structured in accordance with the preferred embodiment of the present invention. As shown, the signature portion of the random access request is transmitted in parallel with the data portion of the request. Consequently, the ratio of the energy in the data portion of the request (e.g., in the shaded area shown) to the energy in the overhead (signature) portion is much higher than the data to overhead energy ratio of the channel format shown in FIG. 6.

Figure 8:
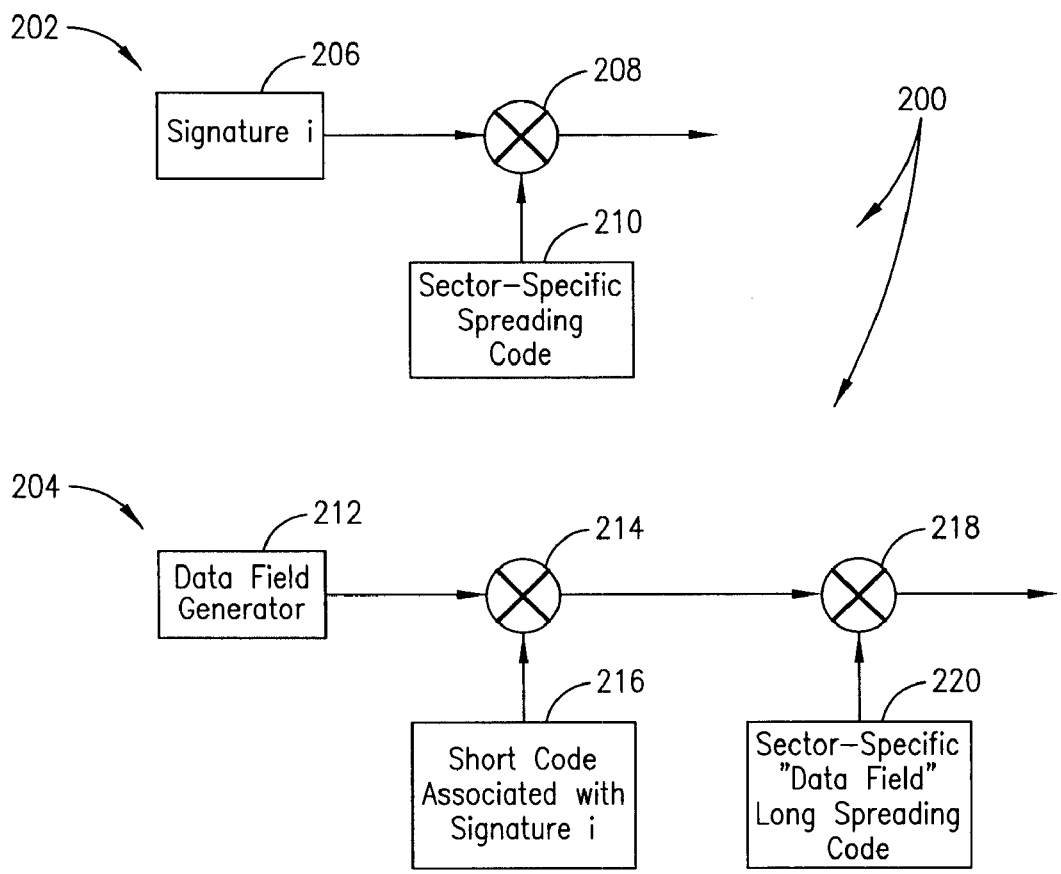
FIG. 8 is a simple block diagram of an exemplary packet generating apparatus that can be used to implement the preferred embodiment of the present invention.
Figure 9:
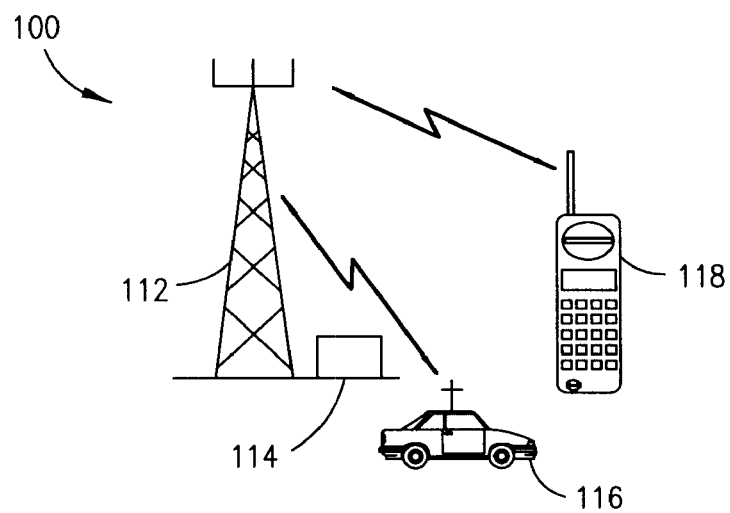
FIG. 9 is a block diagram of a pertinent section of a cellular communications system, which can be used to implement the preferred embodiment of the present invention.

FIG. 8 is a simple block diagram of an exemplary packet generating apparatus that can be used to implement the preferred embodiment of the present invention. In this embodiment, the invention can be implemented as a method and generated to be transmitted on the uplink common physical channel, under the control of a microprocessor located in a mobile station. An example of such a mobile station is shown in FIG. 9, which is a block diagram of a pertinent section of a cellular communications system that can be used to implement the preferred embodiment of the present invention.

System 100 includes a base station transmit/receive antenna 112 and transmitter/receiver section 114, and a plurality of mobile stations 116 and 118. Although only two mobile stations are shown, FIG. 9 is for illustrative purposes only, and the present invention can be assumed to include more than two mobile stations. Prior to generating and transmitting an access request frame, a mobile station (e.g., 116) acquires synchronization, or synchronizes, with a target base station receiver (114). The mobile station then determines the starting time for each slot from the base station's broadcast/pilot channel information. The mobile station also retrieves the number of the slot being processed from the broadcast/pilot channel information, which is to be used by the base station to tag its acknowledgment (ACK) message reply with the slot number to ensure that the correct mobile station receives the acknowledgment. More details for synchronizing a mobile station to a base station in a random access environment can be found in the '501 Application.

The target base station also transfers to the requesting mobile station(s) (e.g., over the downlink broadcast channel) each unique random access spreading code and long-code associated with each of the sectors, cells, etc. defined by the base station transceiver. For example, these unique spreading codes and long-codes can be Gold codes or Kasami codes. The mobile station stores the spreading code and long-code information in a memory storage area (not explicitly shown), which is to be retrieved and used by the mobile station to spread the signature fields and data fields of the random access request packets generated. Finally, the base station also transfers to the requesting mobile station(s) (e.g., in an appropriate broadcast message) the signature patterns associated with the signature fields, which can be used to help distinguish between different sectors, cells, etc.

Returning to FIG. 8, the exemplary apparatus 200 for a mobile station includes a signature generation part 202 and data generation part 204. The signature generation part 202 includes a signal mixer 208, which spreads a "signature i" 206 (e.g., retrieved from the internal memory area in the mobile station) with a specific spreading code 210 for a cell/sector involved (e.g., also retrieved from the internal memory area). Alternatively, the spreading code can be, for example, base station-specific or global in the system involved. The signature generating part 202 thus generates the cell/sector-specific signature part of a random access packet to be transmitted. The signature part's format can be implemented, for example, by spreading the signature field over the entire uplink common physical channel frame, or it can be repeated a number of times within the frame.

The data part of a corresponding random access packet to be transmitted in parallel with the signature part is generated with a data field generator 212. A mixer 214 spreads the generated data field with a unique short spreading code 216 associated with the "signature i". The resulting data field of the corresponding random access packet is then spread with a concatenated code by mixer 218. This concatenated code can be constructed, for example, by a modulo-2 addition (by mixer 218) of the signature-associated short code 216 with a sector-specific long spreading code 220 (e.g., retrieved from internal memory). The length of the resulting data field to be transmitted can be flexibly selected at the mobile station. For this exemplary embodiment, the spread signature field and spread data field can be multiplexed (e.g., time-multiplexed) in order to be transmitted in parallel from a mobile station.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for transferring data over a direct sequence-code division multiple access physical channel, comprising the steps of:

transmitting a data field including said data over said direct sequence-code division multiple access physical channel during a predefined duration;

simultaneously transmitting a signature field over said direct sequence-code division multiple access physical channel during said predefined duration, a signature included in said signature field spread by a first predetermined code, and said data included in said data field spread by a second code associated with said signature; and said signature field also functions as a pilot signal by providing additional energy in the form of known modulated symbols.

2. The method of claim 1, wherein said data field and said signature field are transmitted in parallel.

3. The method of claim 1, wherein a length of said signature field is set substantially equal to a width of a transmission slot.

4. The method of claim 1, wherein a length of said data field is selectively varied.

5. The method of claim 1, wherein said signature field comprises at least one of a plurality of signature patterns.

6. The method of claim 1, wherein said direct sequence-code division multiple access physical channel comprises an uplink common physical channel.

7. A method of transmitting data on a DS-CDMA common physical channel, comprising the steps of:

transmitting a data part of a signal;

transmitting a signature part of said signal in parallel with said data part, wherein said signature part is spread by a predetermined code, and said data part is spread by a code associated with said signature part; and said signature of said signal can also function as a pilot signal.

8. The method of claim 7, wherein said signature part is selected from a predetermined set including at least one signature.

9. The method of claim 8, wherein said predetermined set comprises an orthogonal set.

10. The method of claim 7, wherein said data part and said signature part are scrambled by a predetermined scrambling code.

11. The method of claim 7, further comprising the step of transmitting said signature part and said data part from a mobile station.

12. The method of claim 11, wherein said signature part further comprises a pilot signal.

* * * * *

UNITED STATES PATENT AND TRADEMARK OFFICE
CERTIFICATE OF CORRECTION

PATENT NO.     : 6,442,153 B1
DATED          : August 27, 2001
INVENTOR(S)    : Dahlman et al.

It is certified that error appears in the above-identified patent and that said Letters Patent is hereby corrected as shown below:

<u>Title page,</u>
Item [30], Foreign Application Priority Data, replace "9703872" with -- 9703872-3 --

<u>Drawings,</u>
Figures 1-6, add -- PRIOR ART --

<u>Column 8,</u>
Line 32, replace "said signature of said signal" with -- said signature part of said signal --

Signed and Sealed this

Twenty-seventh Day of May, 2003

JAMES E. ROGAN
*Director of the United States Patent and Trademark Office*